US011663454B2

(12) United States Patent
Wen et al.

(10) Patent No.: US 11,663,454 B2
(45) Date of Patent: May 30, 2023

(54) DIGITAL INTEGRATED CIRCUIT WITH EMBEDDED MEMORY FOR NEURAL NETWORK INFERRING

(71) Applicant: Aspiring Sky Co. Limited, Hong Kong (CN)

(72) Inventors: Yujie Wen, Shanghai (CN); Zhijiong Luo, Hopewell Township, PA (US)

(73) Assignee: Aspiring Sky Co. Limited, Hong Kong (CN)

( * ) Notice: Subject to any disclaimer, the term of this patent is extended or adjusted under 35 U.S.C. 154(b) by 468 days.

(21) Appl. No.: 16/832,400

(22) Filed: Mar. 27, 2020

(65) Prior Publication Data

US 2020/0311530 A1 Oct. 1, 2020

Related U.S. Application Data

(60) Provisional application No. 62/826,252, filed on Mar. 29, 2019.

(51) Int. Cl.
*G06N 3/063* (2023.01)
*G06F 17/15* (2006.01)
*G06N 3/08* (2023.01)
*G06F 12/04* (2006.01)
*G06N 3/04* (2023.01)

(52) U.S. Cl.
CPC ............. *G06N 3/063* (2013.01); *G06F 12/04* (2013.01); *G06F 17/153* (2013.01); *G06N 3/04* (2013.01); *G06N 3/08* (2013.01)

(58) Field of Classification Search
None
See application file for complete search history.

(56) References Cited

U.S. PATENT DOCUMENTS

| | | | | |
|---|---|---|---|---|
| 9,779,786 | B1 * | 10/2017 | Wu | G06K 9/6273 |
| 10,489,479 | B1 * | 11/2019 | Shalev | G06F 17/12 |
| 2005/0257026 | A1 * | 11/2005 | Meeker | G06T 1/20 712/13 |
| 2018/0314671 | A1 * | 11/2018 | Zhang | G06N 3/063 |
| 2019/0187983 | A1 * | 6/2019 | Ovsiannikov | G06F 9/3889 |
| 2019/0294413 | A1 * | 9/2019 | Vantrease | G06N 3/063 |
| 2020/0160905 | A1 * | 5/2020 | Charles | G11C 11/417 |

* cited by examiner

*Primary Examiner* — Joni Hsu
(74) *Attorney, Agent, or Firm* — RatnerPrestia

(57) ABSTRACT

A digital integrated circuit with embedded memory for neural network inferring may include a controller and a matrix of processing blocks and cyclic bidirectional interconnections, where each processing block is coupled to 4 neighboring processing blocks regardless of its position in the matrix. A cyclic bidirectional interconnection may transmit every processing block's output to its upper, lower, left, right neighboring blocks or to its cyclic neighbors of the same row or column in replacement of any missing upper, lower, left or right neighbors. Each processing block may include invariant word buffers, variant word buffers, a multiplexer, and a processing unit. The multiplexer may select one of the 4 neighbor processing blocks' outputs. The processing unit may accept as inputs the multiplexer's selected value, a selected value from the variant word buffers and a selected value from the invariant word buffer and produce output which acts as the processing block's output.

18 Claims, 17 Drawing Sheets

$$MAC(n, i) = n + iP \quad (1)$$

$$MAC_4\left(\begin{pmatrix}n_0\\n_1\\n_2\\n_3\end{pmatrix}^T, \begin{pmatrix}i_0\\i_1\\i_2\\i_3\end{pmatrix}^T\right) = \begin{pmatrix}n_0 + p_{00}i_0 + p_{10}i_1 + p_{20}i_2 + p_{30}i_3\\ n_1 + p_{01}i_0 + p_{11}i_1 + p_{21}i_2 + p_{31}i_3\\ n_2 + p_{02}i_0 + p_{12}i_1 + p_{22}i_2 + p_{32}i_3\\ n_3 + p_{03}i_0 + p_{13}i_1 + p_{23}i_2 + p_{33}i_3\end{pmatrix}^T \quad (2)$$

$$C\left(\begin{pmatrix}i_0\\i_1\\i_2\\i_3\end{pmatrix}^T, \begin{pmatrix}n_0\\n_1\\n_2\\n_3\end{pmatrix}^T\right) = \begin{pmatrix}n_0 & +i_3p_0\\n_1\\n_2\\n_3\end{pmatrix}^T \quad (C.1)$$

$$C\left(\begin{pmatrix}i_0\\i_1\\i_2\\i_3\end{pmatrix}^T, \begin{pmatrix}n_0\\n_1\\n_2\\n_3\end{pmatrix}^T\right) = \begin{pmatrix}n_0 & & +i_0p_1 & +i_1p_2\\n_1 & +i_0p_0 & +i_1p_1 & +i_2p_2\\n_2 & +i_1p_0 & +i_2p_1 & +i_3p_2\\n_3 & +i_2p_0 & +i_3p_1 &\end{pmatrix} (C.2)$$

$$C\left(\begin{pmatrix}i_0\\i_1\\i_2\\i_3\end{pmatrix}^T, \begin{pmatrix}n_0\\n_1\\n_2\\n_3\end{pmatrix}^T\right) = \begin{pmatrix}n_0\\n_1\\n_2\\n_3 & +i_0p_2\end{pmatrix} \quad (C.3)$$

FIG. 14

$$P_h\left(\begin{pmatrix}i_0\\i_1\\i_2\\i_3\end{pmatrix}^T\right) = \begin{pmatrix}M(i_0,i_1)\\M(i_2,i_3)\\\emptyset\\\emptyset\end{pmatrix}^T$$

$$P_v\left(\begin{pmatrix}i_0\\i_1\\i_2\\i_3\end{pmatrix}^T,\begin{pmatrix}n_0\\n_1\\n_2\\n_3\end{pmatrix}^T\right) = \begin{pmatrix}M(i_0,n_0)\\M(i_1,n_1)\\M(i_2,n_2)\\M(i_3,n_3)\end{pmatrix}^T$$

$$C\left(\begin{pmatrix}i_0\\i_1\\i_2\\i_3\end{pmatrix}^T,\begin{pmatrix}n_0\\n_1\\n_2\\n_3\end{pmatrix}^T\right) = \begin{pmatrix}i_0\\i_1\\n_0\\n_1\end{pmatrix}^T$$

where $M(a,b) = \begin{cases}max(a,b) & \text{For maximum pooling}\\ a+b & \text{For average pooling}\end{cases}$ $\emptyset$ is a dont-care value

FIG. 16

DIGITAL INTEGRATED CIRCUIT WITH EMBEDDED MEMORY FOR NEURAL NETWORK INFERRING

CROSS REFERENCE TO RELATED APPLICATIONS

This application claims the benefit of U.S. Provisional Patent Application Ser. No. 62/826,252 filed on Mar. 29, 2019. The disclosures of the provisional application are hereby incorporated by reference for all purposes.

BACKGROUND

Unless otherwise indicated herein, the materials described in this section are not prior art to the claims in this application and are not admitted to be prior art by inclusion in this section.

Memory/processing architectures are designed to meet latency, bandwidth, and power goals. Typical architectures include multiple layers of caching and hardware cache-coherency management schemes. Artificial intelligence/machine learning circuits can differ significantly in power demand, in latency requirements, in dedicated safety-critical applications and in new layout challenges for high-performance applications, between different edge classes of application and datacenter applications. For example, a systolic array is a well-known parallel computing architecture. A processing block in systolic array has no local buffers for storing and loading computation results. It always passes its immediate output to neighboring processing blocks and accepts neighboring processing blocks immediate output for computation. An interconnection of a systolic array is not cyclic. Processing blocks at the edge of a systolic array have fewer neighbor processing blocks than those in the center of the array.

SUMMARY

Briefly stated, technologies are generally described herein for a digital integrated circuit with embedded memory for neural network inferring and methods thereof.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 11 illustrates an example multiply-accumulate function;
FIG. 14 illustrates implementation of partial convolution functions;
FIG. 16 illustrates example partial convolution functions.

DETAILED DESCRIPTION

Figure 1:
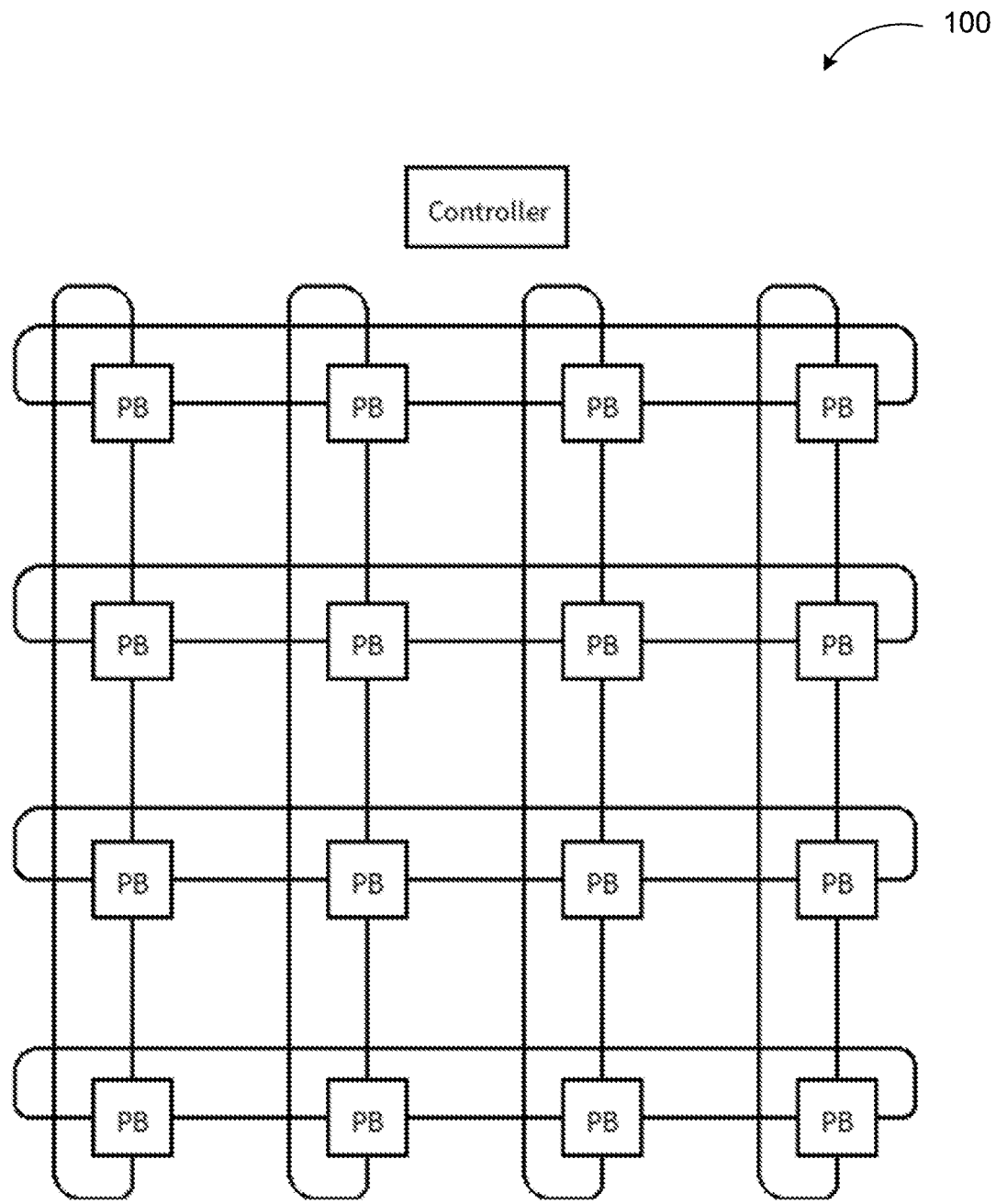
FIG. 1 is a schematic circuit diagram illustrating main components of a system including a controller and an M×N matrix of processing blocks.

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented herein. The aspects of the present disclosure, as generally described herein, and illustrated in the figures, can be arranged, substituted, combined, separated, and designed in a wide variety of different configurations, all of which are explicitly contemplated herein.

This disclosure is generally drawn, inter alia, to technologies for a digital integrated circuit with embedded memory for neural network inferring and methods thereof. An example digital circuit may include a controller and a matrix of processing blocks and cyclic bidirectional interconnections, where each processing block is coupled to 4 neighboring processing blocks regardless of its position in the matrix. A cyclic bidirectional interconnection may transmit every processing block's output to its upper, lower, left, right neighboring blocks or to its cyclic neighbors of the same row or column in replacement of any of the missing upper, lower, left or right neighbors. Each processing block may include invariant word buffers, variant word buffers, a multiplexer, and a processing unit. The multiplexer may select one of the 4 neighbor processing blocks' outputs. The processing unit may accept as inputs the multiplexer's selected value, a selected value from the variant word buffers and a selected value from the invariant word buffer and produce output which acts as the processing block's output.

FIG. 1 is a schematic circuit diagram illustrating main components of a system including a controller and an M×N matrix of processing blocks, arranged in accordance with embodiments described herein.

As shown in diagram 100, embodiments include an M×N matrix of processing blocks (PBs) and a controller. The matrix sizes M and N are not restricted to any specific integer value. There are bidirectional connections between each pair of horizontally or vertically neighboring PBs.

There are the same bidirectional connections between the leftmost and the rightmost PBs of each row of the matrix, and between the uppermost and the lowermost PBs of each column of the matrix, so that every row and column has cyclic connections. By employing the aforementioned connections, any PB in the matric always has four neighbor PBs, noted as its left, right, upper and lower neighbor. For any PB that resides on the edge of the matrix, its vertical and/or horizontal cyclic neighbor PBs act as its missing left/right/upper/lower neighbor. The controller provides global control over all PBs' actions. It also routes data (parameters of a neural network and input to a neural network as typical examples) to and retrieve data (output of a neural network as a typical example) from specific PBs. The connection between the controller and PBs can be implemented by a number of techniques like buses. Diagram 100 illustrates the top view of an example embodiment, where the matrix size is 4×4. The global control circuitry and data buses are ignored for the sake of the clarity of PB interconnections. In practice each PB may be connected to N PBs, N being any integer number, for example, N may be between 1 and 8.

Figure 2:
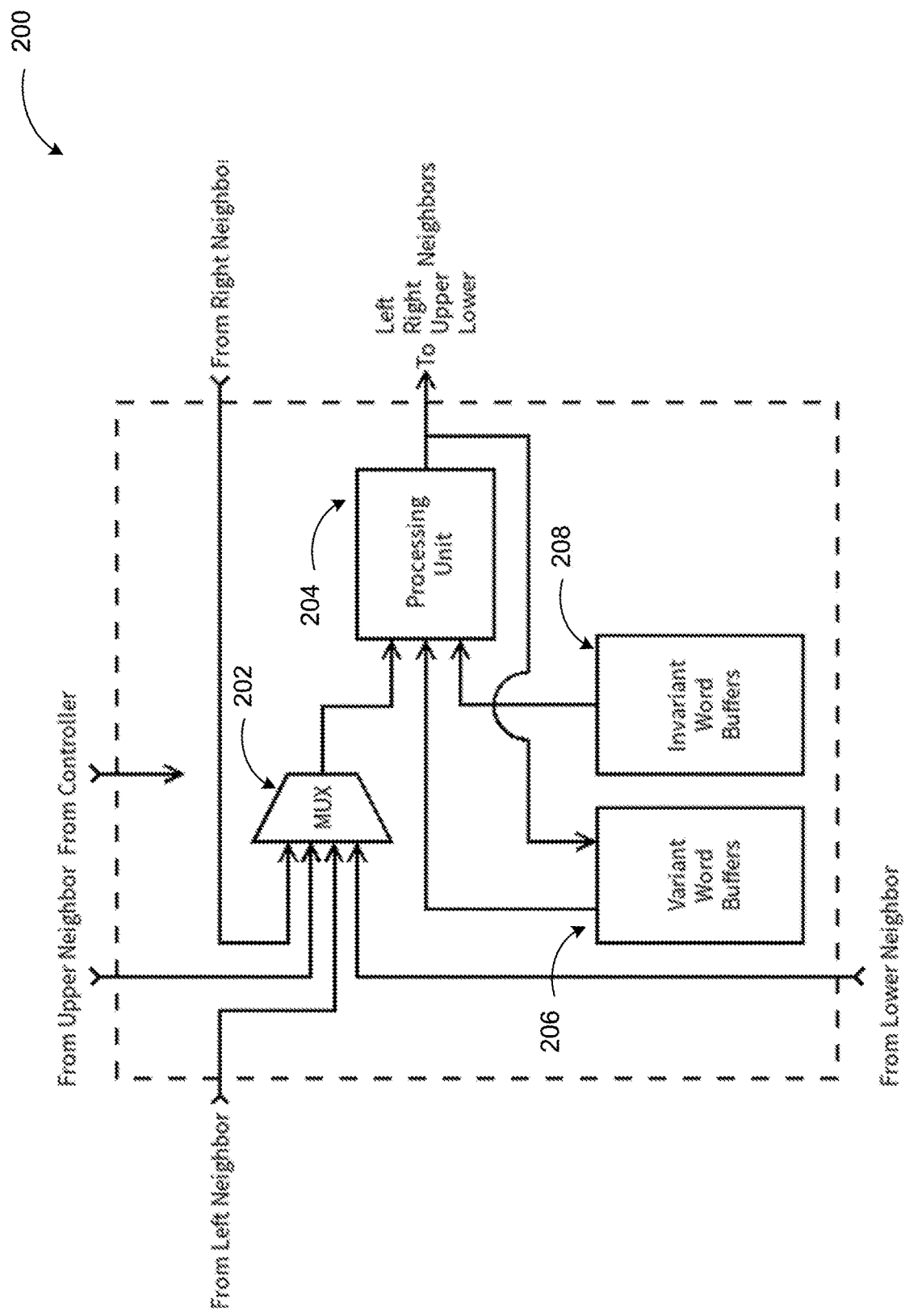
FIG. 2 is a schematic circuit diagram illustrating an example processing block.

FIG. 2 is a schematic circuit diagram illustrating an example processing block, arranged in accordance with embodiments described herein.

As shown in FIG. 2, a PB 200 accepts input data from its four neighbor PBs. It also produces output data that can be accepted by its four neighbor PBs. There is another input data from the controller for controlling PB's behavior. PB contains two buffers, one for storing invariant words 208 during one complete neural network inferring procedure (from accepting input data to generating output data). Typical examples of such invariant values include the neural network's parameters. The other buffer is for storing variant words 206 during the inferring procedure, typical examples of which is the layer input data of a neural network. The two buffers are not necessarily to be implemented into two separate entities (random-access-memory blocks as an example). It is also feasible the two buffers share the same entity by techniques like time-division sharing. There is a processing unit (PU) 204 which reads in three input data and produces one output data. Two of the three input data are words selected from the variant and the invariant word buffers 206, 208, while the other input data is a selected word from the four neighbor PBs' outputs. The selection from buffers and neighbor outputs can be implemented by techniques like memory addressing and multiplexing (e.g., by multiplexer 202). But there is no restriction on the specific implementation of selections. The output of PU 204 acts as the output of PB so that it can be transmitted to the corresponding input of the PB's four neighbors. The output can also be saved back to the variant word buffers. The PU input selection, the saving of PU output to buffers and the exact function performed by PU to generate output value are controlled by either direct input data from the controller or local instructions saved in the invariant buffer which is selected by the input data. The diagram illustrates the data routing within PB. The routing from controller input to the PB, the value buffers and the multiplexer are ignored.

Figure 3:
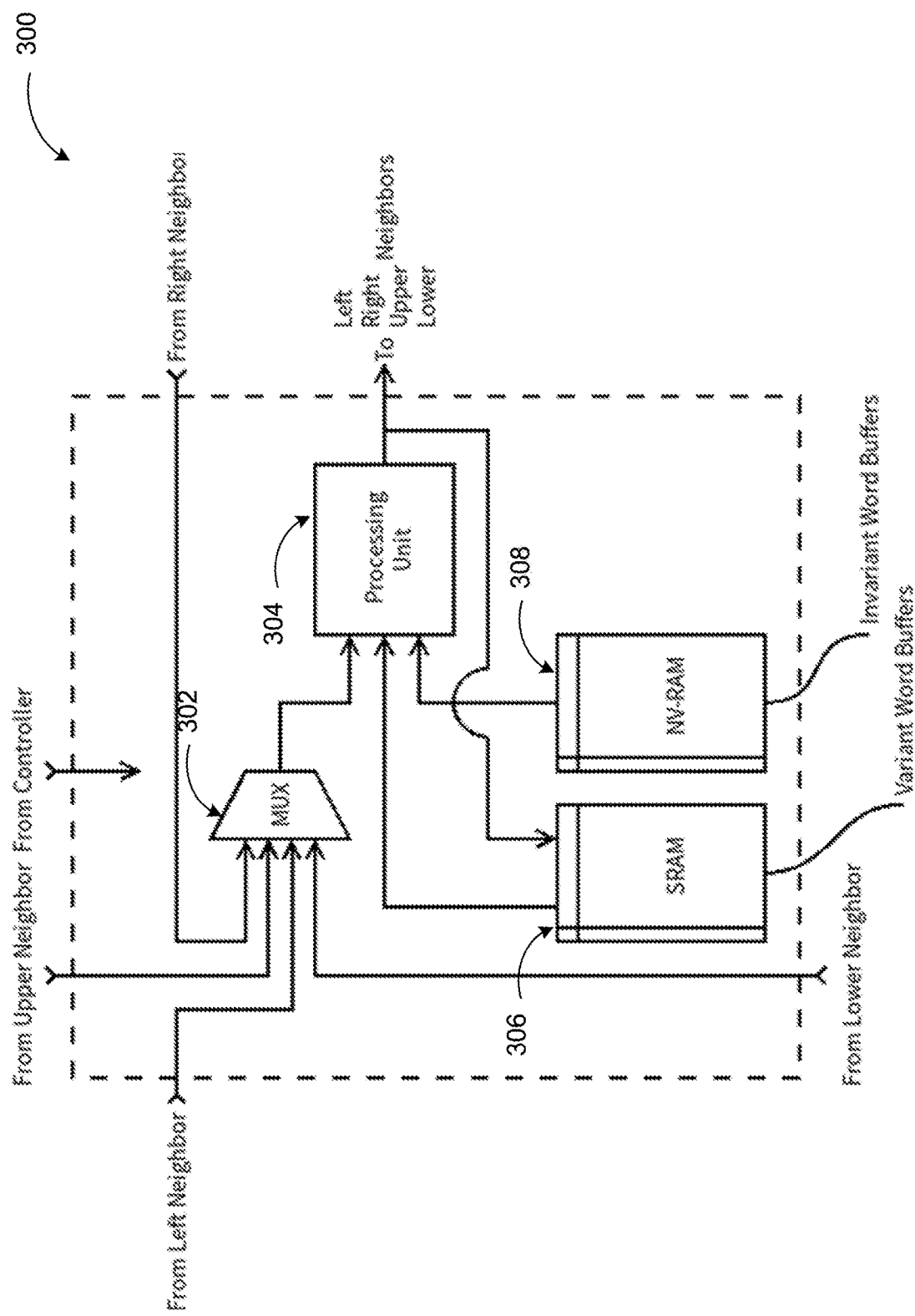
FIG. 3 is a schematic circuit diagram illustrating an example processing block with embedded memories.

FIG. 3 is a schematic circuit diagram illustrating an example processing block with embedded memories, arranged in accordance with embodiments described herein.

In one specialized form of the processing block 300, the variant word buffers are implemented by a static random-access memory (SRAM) block 306, and the invariant word buffers are implemented by a non-volatile random-access memory (NV-RAM) block 308. The PB 300 also include processing unit 304 and multiplexer 302 as in FIG. 2 By storing network parameters and necessary local instructions into the NV-RAM blocks, the whole PB matrix can standby with very low power dissipation. Once activated, the matrix is immediately ready for performing inferring on given inputs without any extra setup procedure.

Figure 4:
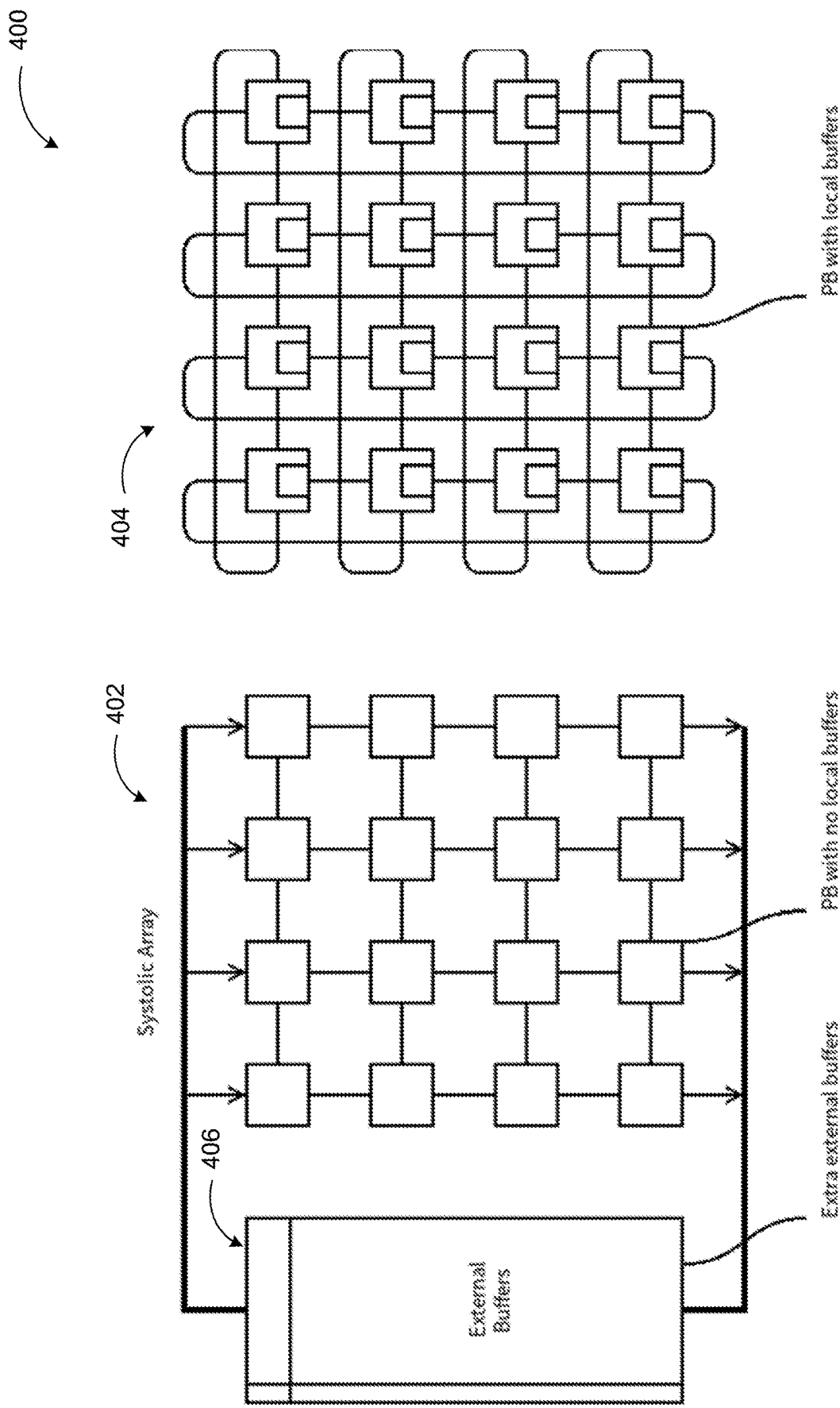
FIG. 4 is a schematic circuit diagram illustrating differences between a systolic array and a processing block matrix.

FIG. 4 is a schematic circuit diagram illustrating differences between a systolic array and a processing block matrix, arranged in accordance with embodiments described herein.

Systolic array is a well-known parallel computing architecture which also comprises of a controller, a matrix of processing blocks and interconnections between processing blocks. As shown in diagram 400, a processing block matrix 404 according to embodiments differs from a systolic array 402 as follows: (1) The processing block in systolic array has no local buffers for storing and loading computation results. It always passes its immediate output to neighboring PBs and accepts neighboring PBs immediate output for computation. While the processing blocks according to embodiments employ such buffers so that the immediate computation results can be passed to neighboring PBs and/or saved into local buffers for later computation. (2) The interconnection of a systolic array is not cyclic. PBs at the edge of a systolic array have fewer neighbor PBs than those in the center of the array. While every PB according to embodiments has equal number of neighboring PBs. There are cyclic connections between PBs at the edges of the matrix. (3) When performing neural network inferring, due to the absence of local buffers, the systolic array 402 usually requires extra external buffers 406 for storing and loading each layer's inputs and parameters. In contrast, embodiments do not require external buffers because all the layer parameters and input values are saved in PB local buffers.

Figure 5:
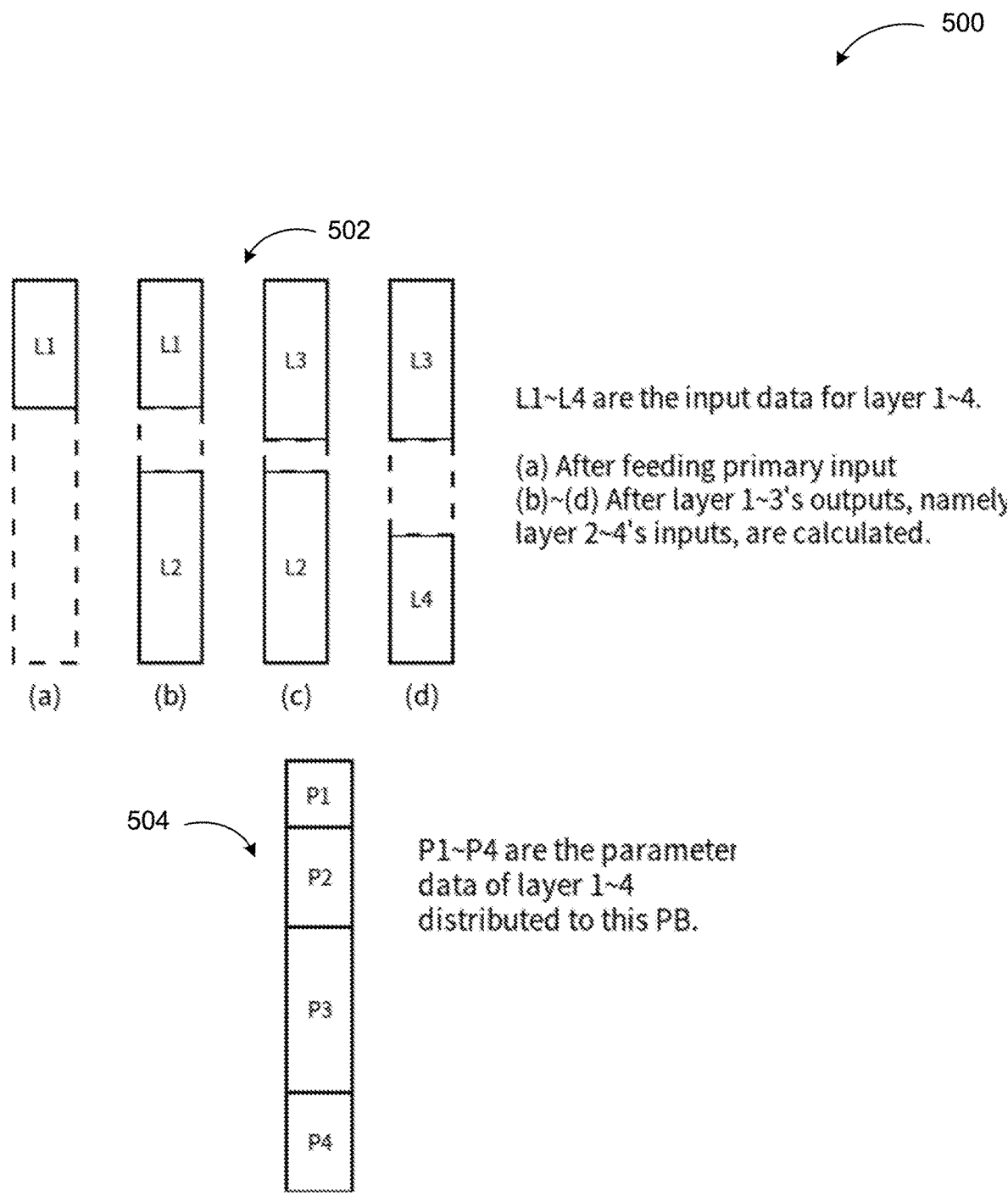
FIG. 5 illustrates network data arrangement.

FIG. 5 illustrates network data arrangement, arranged in accordance with embodiments described herein.

A neural network may include of multiple convolutional layers, dense layers and pooling layers. Layers are connected in serial manner that one layer's input is the output of its preceding layer with one exception that the input of the network's first layer comes from the network's primary input (502). Each layer's input data is distributed to the variant word buffers of every PB. The distribution rule will be discussed in detail in following sections. Noting that when a layer's output has been calculated out, its input will never be referenced again, so the resources in variant word buffers can be reused for storing multiple layer's inputs. Diagram 500 illustrates an example of layer input data arrangement of one PB variant word buffers for calculating the first 4 layers' 502 output of a neural network, where dashed boxes represents unused resources. Layers usually need parameters for calculating its output by given input. The parameters of all layers are distributed (504) to every PB's invariant word buffers in a manner that every PB has the necessary portion of a layer's parameter for calculating the portion of the layer's output distributed to it. Parameters are preloaded in advance and remain unchanged during the neural network inferring procedure. An example of parameter arrangement 504 in one PB's invariant value buffers is also shown.

Figure 6:
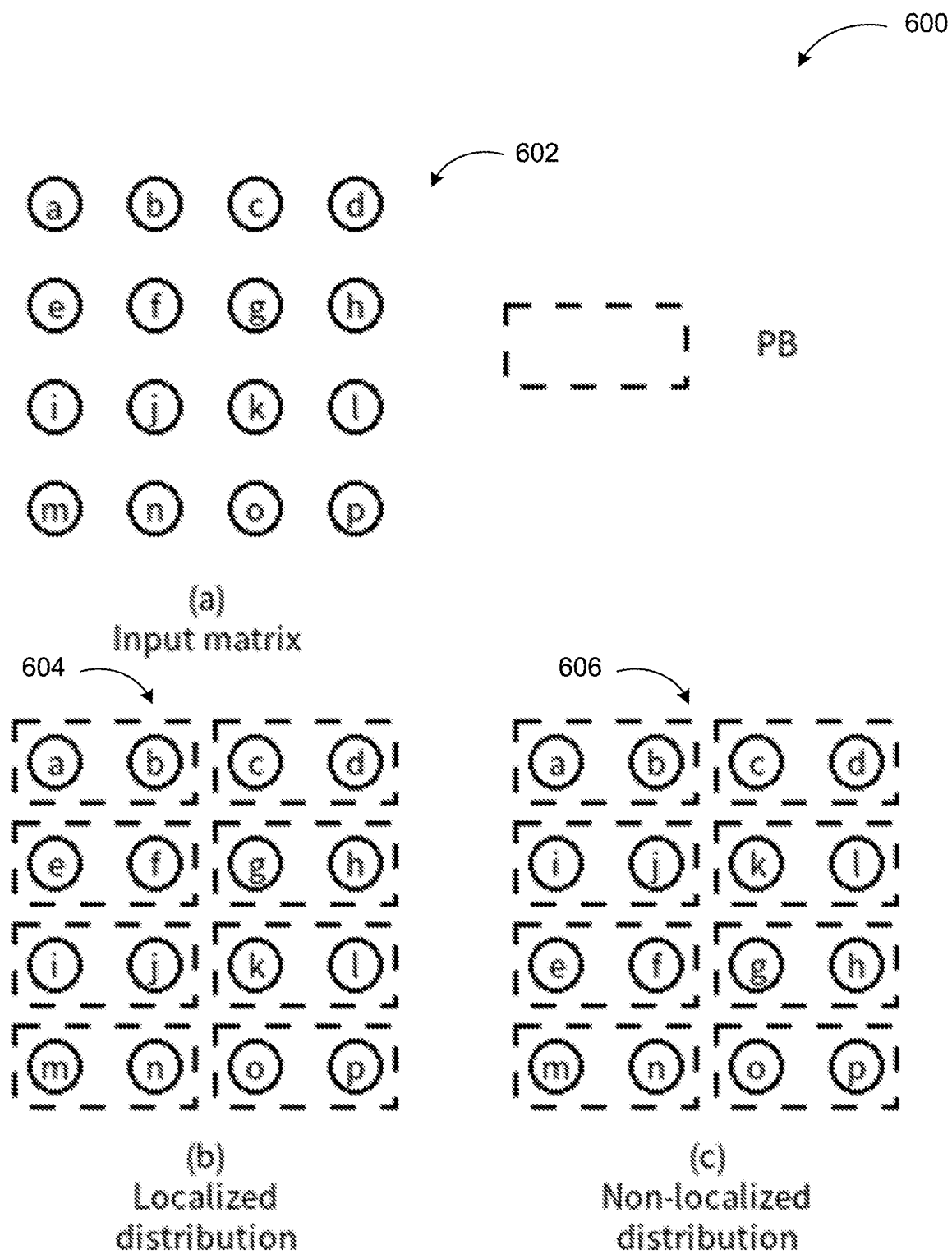
FIG. 6 illustrates localized distribution.

FIG. 6 illustrates localized distribution, arranged in accordance with embodiments described herein.

In order to perform parallel computation for a given neural network layer by utilizing a maximum possible number of PBs in the PB matrix, it is necessary to distribute the layer's input values to as many PBs as possible. Since layer inputs are distributed to multiple PBs, it is usually unavoidable to extract inputs from multiple PBs in order to compute one layer's output. Computation spanning multiple PBs 602 can be performed by computing partial results for each PB's local inputs and transmitting partial results across PBs. Layer's inputs are usually organized into either a vector, a matrix or a tensor. For most of the neural network layers, any of the layer's outputs depends on a sub-section of the input organization. To reduce the distance of partial output value transmission, one type of input distribution is identified as localized distribution 604. The localized distribution satisfies that any two neighboring inputs in the input organization are distributed to either the same PB, or two neighboring PBs in the PB matrix. Diagram 500 illustrates an example of localized distribution 604 and a non-localized distribution 606. The distribution in sub-graph (c) (606) is not a localized one because inputs a and e neighboring in the input matrix are distributed to two non-neighboring PBs. Localized distribution ensures that the partial output transmission for any output of a layer is restricted to a set of neighboring PBs. This restriction reduces overall computation time and power consumption of neural network inferring.

Figure 7:
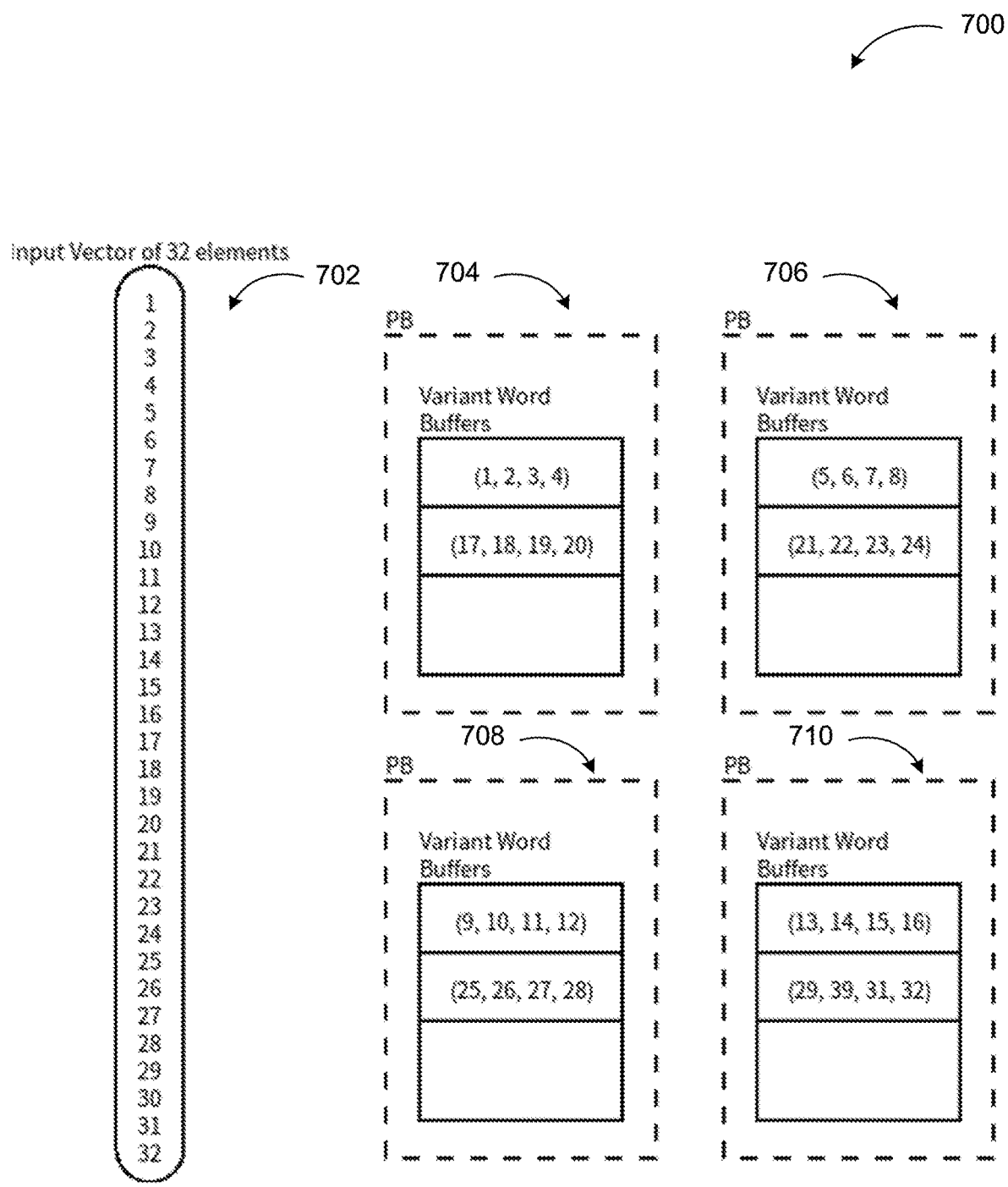
FIG. 7 illustrates input vector distribution.

FIG. 7 illustrates input vector distribution, arranged in accordance with embodiments described herein.

Diagram 700 shows an example input vector 702 of 32 elements and resulting example PB buffers 704, 706, 708, and 710 storing various combinations of the input vector's elements. The input of a dense layer is always a vector whose every element is represented by E bits. The words stored in PB buffers are represented by W bits where W is a multiple of E (W=nE). Therefore, one word in PB buffers can represent an n-tuple of vector elements. Since any output of a dense layer is a linear combination of all the layer's inputs, the computation for any output must requires partial result transmission across all of the PBs. The input vector distribution for a dense layer is not necessary to be a localized one. Given an M×N matrix of PBs and an input vector of V elements, a distribution for the input vector can be obtained by first zero-padding the input vector to having V' elements, where V'=mnMN, then grouping the V' elements into mMN n-tuples and finally dividing the n-tuples into MN groups. Each group is distributed to one individual PB. Diagram 700 illustrates one possible example of such input vector distribution. In the example, one word represents a 4-tuple of input elements (n=4). The padded vector size is V'=32. PB matrix is of 2×2.

Figure 8:
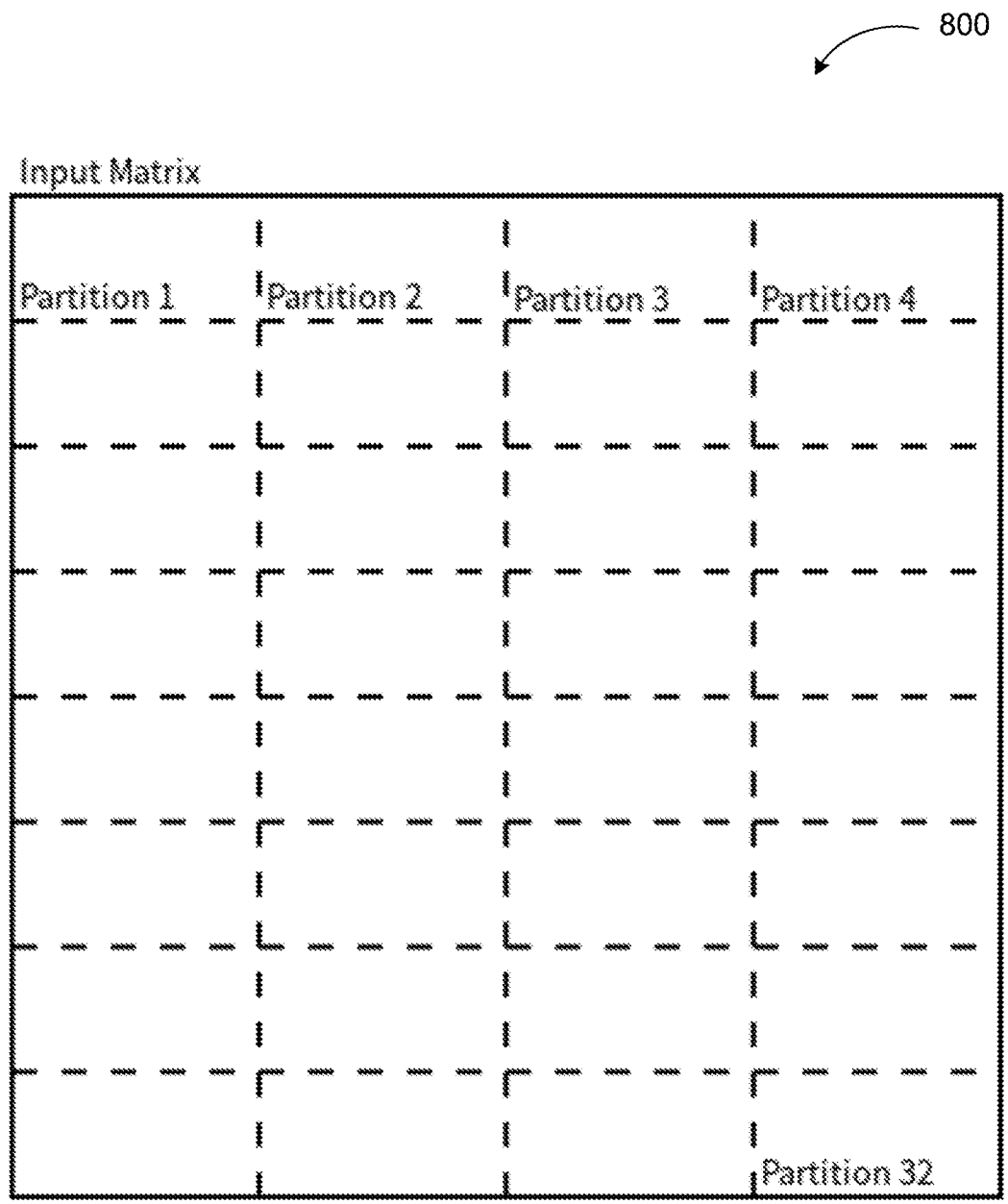
FIG. 8 illustrates input matrix partition.

FIG. 8 illustrates input matrix partition, arranged in accordance with embodiments described herein.

The inputs of a convolutional layer are usually organized into a tensor. A tensor can be regarded as a vector of input matrices. A localized distribution of an input tensor can be easily derived from the localized distributions of its input matrices. Given an M×N matrix of PBs with buffer word representing an n-tuple of input values, the PB matrix can process nMN matrix elements in parallel. Some embodiments restrict the input matrix's size to be aM×bnN, so that it can be sliced into a×b partitions of dimension M×nN. Diagram 800 is an example where a=8 and b=4. The input matrix is sliced into 32 partitions.

Figure 9:
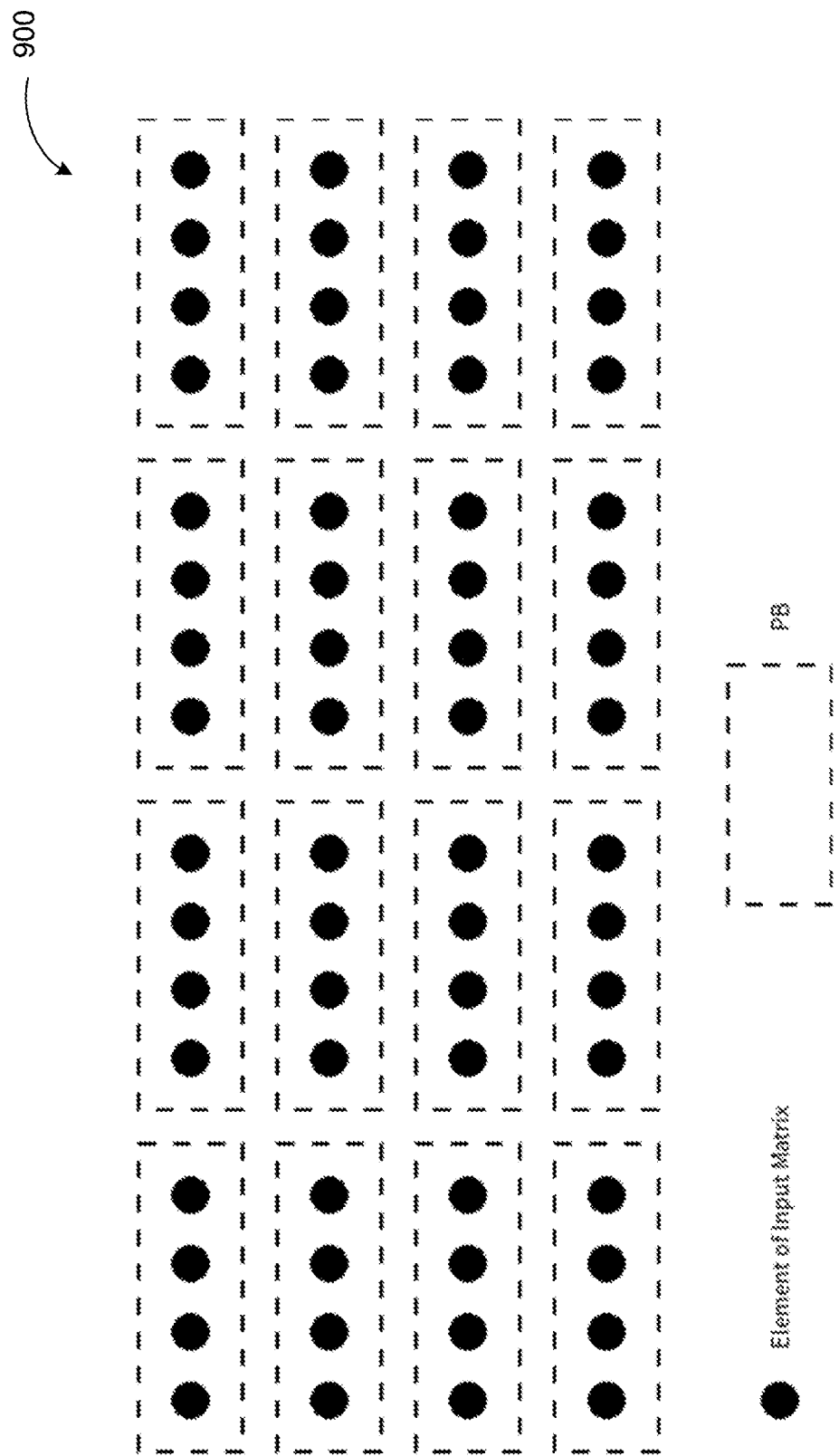
FIG. 9 illustrates partition distribution.

FIG. 9 illustrates partition distribution, arranged in accordance with embodiments described herein.

For every partition of size M×nN, the input at row i and column j is distributed to PB at row i and column floor(j/n), where floor(x) return the maximum integer not greater than x (row and column indices starts from 0). Diagram 900 is an example of mapping 4×16 input partitions to 4×4 PB matrix. A localized distribution of an input matrix can be obtained by first dividing the matrix into partitions and then distributing each input by the partition's distribution the input belongs to.

Figure 10:
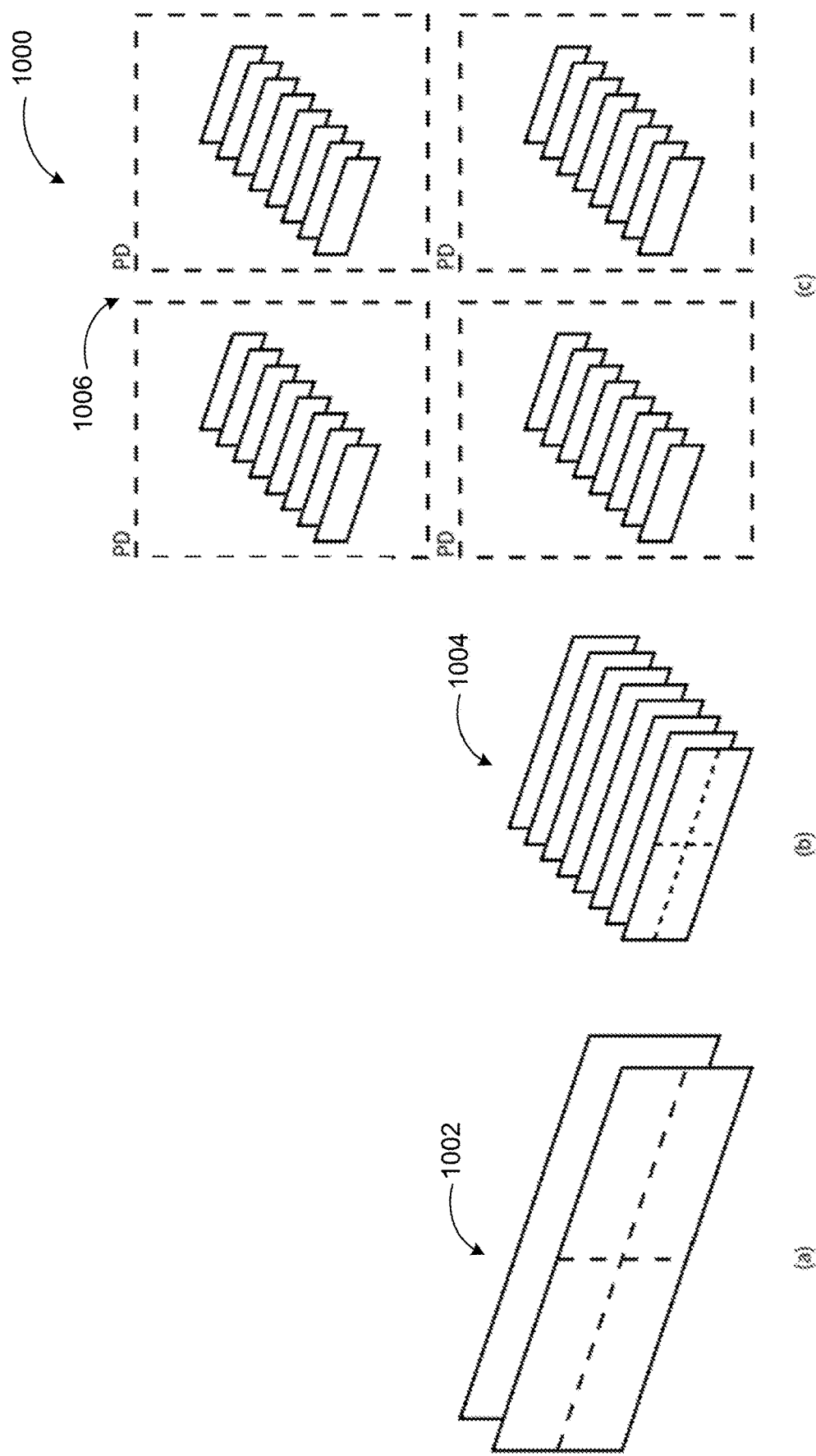
FIG. 10 illustrates input tensor distribution.

FIG. 10 illustrates input tensor distribution, arranged in accordance with embodiments described herein.

A localized distribution of an input tensor can be derived from the matrix distribution for all its matrices by assigning input in the tensor to the same PB determined by the matrix distribution the input belongs to. Diagram 1000 is an example of distributing an input tensor 1002 of size 4×16×2 to a 2×2 PD matrix 1006, where the word in each PD saves a 4-tuple of input values.

A processing unit (PU) according to examples is capable of implementing multiple kinds of functions on inputs from local variant buffers and/or from neighbor PBs, with parameters from local invariant buffers. The following kinds of functions are available: (1) Multiply-accumulate functions; (2) Partial convolution functions; (3) Partial Pooling functions; (4) Normalization functions; (5) Identity function. The exact function to be performed is determined by either the global controller's input or by local instructions saved in invariant buffers. The support for local instructions allows the PB matrix to perform heterogeneous functions. Normalization functions perform layer required normalization on every input value with provided parameters from the invariant word buffer. The Identity function maps input to function output without any change, so that data can bypass a particular PB and be transmitted as far as desired. The multiply-accumulate function, the partial convolution function, and the partial pooling functions are described in detail in the following sections.

FIG. 11 illustrates an example multiply-accumulate function, arranged in accordance with embodiments described herein.

The multiply-accumulate function (MAC) 1100 multiples an input vector i (from local variant buffer) with a parameter matrix P (from local invariant buffer) and accumulated the result vector with an input vector n (from one of the 4 neighbor PBs' outputs), as showed by the equation (1). Equation (2) illustrates the detail computation of the MAC function on vectors of 4 elements. MAC functions are used for implementing dense-layer computations. Dense layer's each output is a linear combination of the layer's all inputs. Since the layer's inputs are distributed to all the PBs, to compute one output, computation starts from an initial PB, the MAC function is performed to obtain a partial linear combination of that PB's local inputs, and the partial result is passed to neighbor PBs to accumulate more inputs by MAC. This procedure is repeated until all PBs have been visited.

Figure 12:
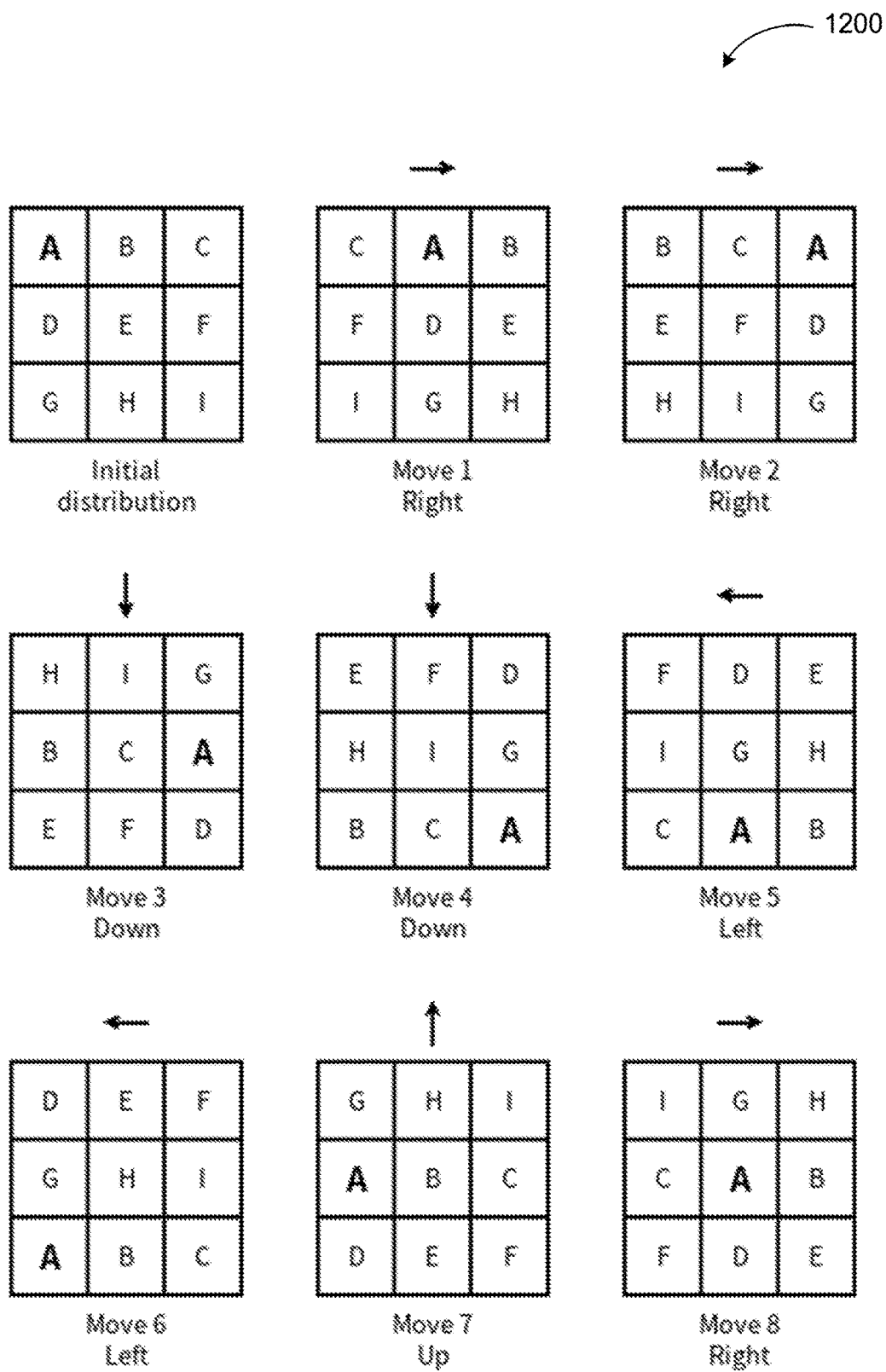
FIG. 12 illustrates parallel execution through multiply-accumulate function.

FIG. 12 illustrates parallel execution through multiply-accumulate function, arranged in accordance with embodiments described herein.

All the PBs in the PB matrix can perform MAC function and pass results to neighbors of a globally determined direction without conflicts. Diagram 1200 is an example of a 3×3 PB matrix working in parallel for dense layer computation. In the initial distribution, each PB is assigned a sub-set of a dense layer output, noted as A~I. After all the PBs have computed the partial MAC values for all the outputs on its input set, the partial results are passed to the neighboring PBs of directions determined by the global controller. After 8 moves, all the output sub-sets A~I have accumulated the partial MAC results from all the PBs, so all the complete outputs have been computed. The output set A is highlighted merely as a reference of the global movements.

Figure 13:
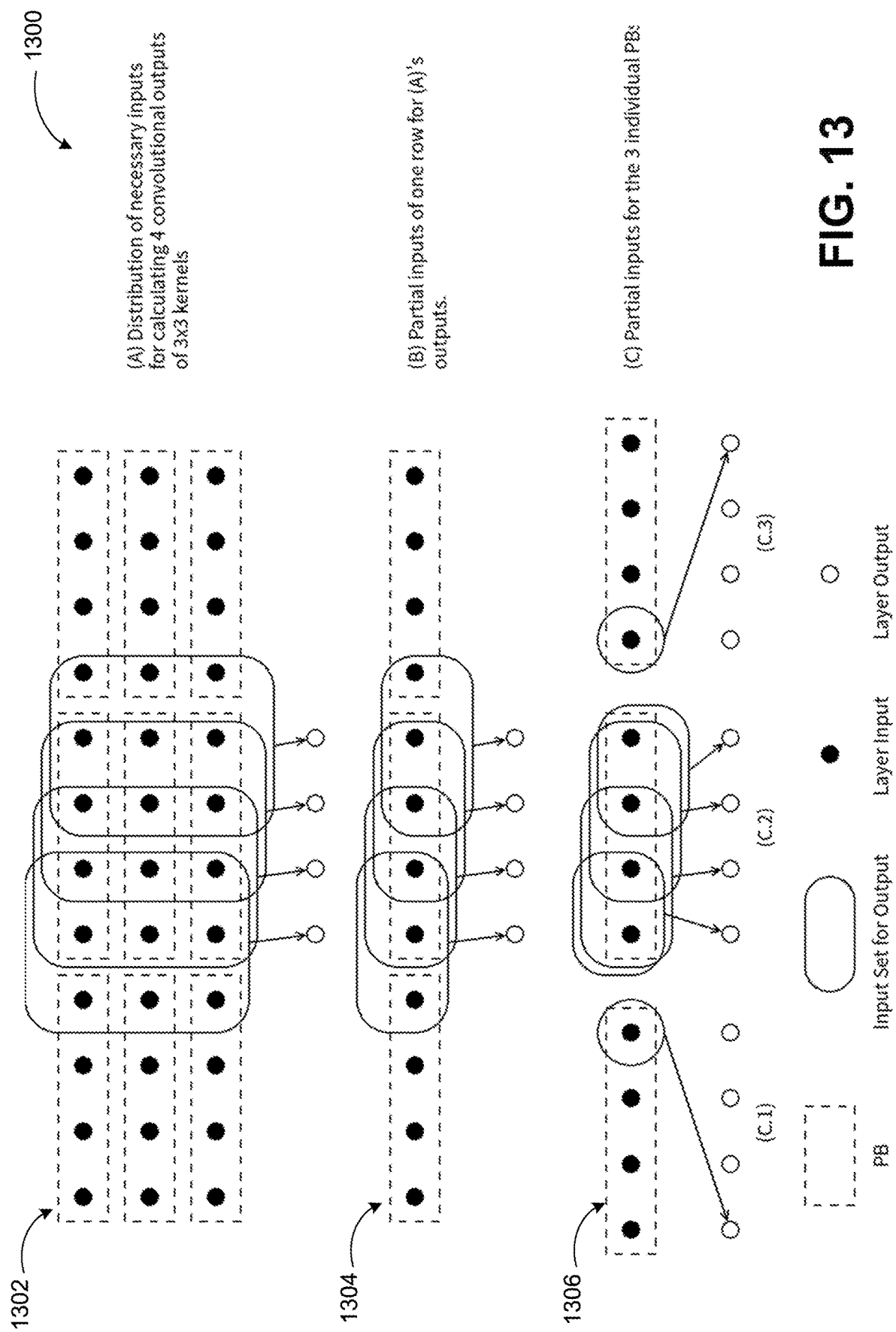
FIG. 13 illustrates decomposition of partial convolution functions.

FIG. 13 illustrates decomposition of partial convolution functions, arranged in accordance with embodiments described herein.

Partial convolution functions are a set of functions for implementing computations of convolutional layers. Those functions cover variable kernel size. When assigned a subset of convolutional layer's outputs, a PB computes for each output in the sub-set the partial sum relating to its local inputs and accumulates the results with neighbor PB's partial sum. The complete sum can be achieved by accumulating the partial sums from PBs holding all the necessary inputs. Diagram 1300 illustrates how the convolutional sums are decomposed and mapped to each PB. Sub-diagram (A) 1302 shows the necessary input sets for 4 convolutional outputs with 3×3 kernel size, which are distributed to a 3×3 area of the PB matrix. Sub-diagram (B) 1304 shows the input distribution within a row of PBs. Sub-diagram (C) 1306 shows the necessary computation for each PB in order to achieve sub-diagram (B)'s partial sums.

FIG. 14 illustrates implementation of partial convolution functions, arranged in accordance with embodiments described herein.

Functions 1400 of each PB in graphs (C.1), (C.2), and (C.3) of the previous section. By accumulating the partial sum of all the PBs showed in the previous section using the proper functions according to PB's position in a row, the complete convolutional sums can be achieved. Similar to dense layer's computation, a convolutional layer's computation can be done in parallel by assigning each PB one set of outputs, calculating the initial partial sums, transmitting and accumulating the partial sums over all the necessary PBs. The above example illustrates the partial convolutional functions necessary for 3×3 kernel. However, kernels of other size like 5×5, 7×7 and so on are also supported by PU. Support for partial convolutional functions of variable kernel sizes can be implemented by deliberately designed circuitry.

Figure 15:
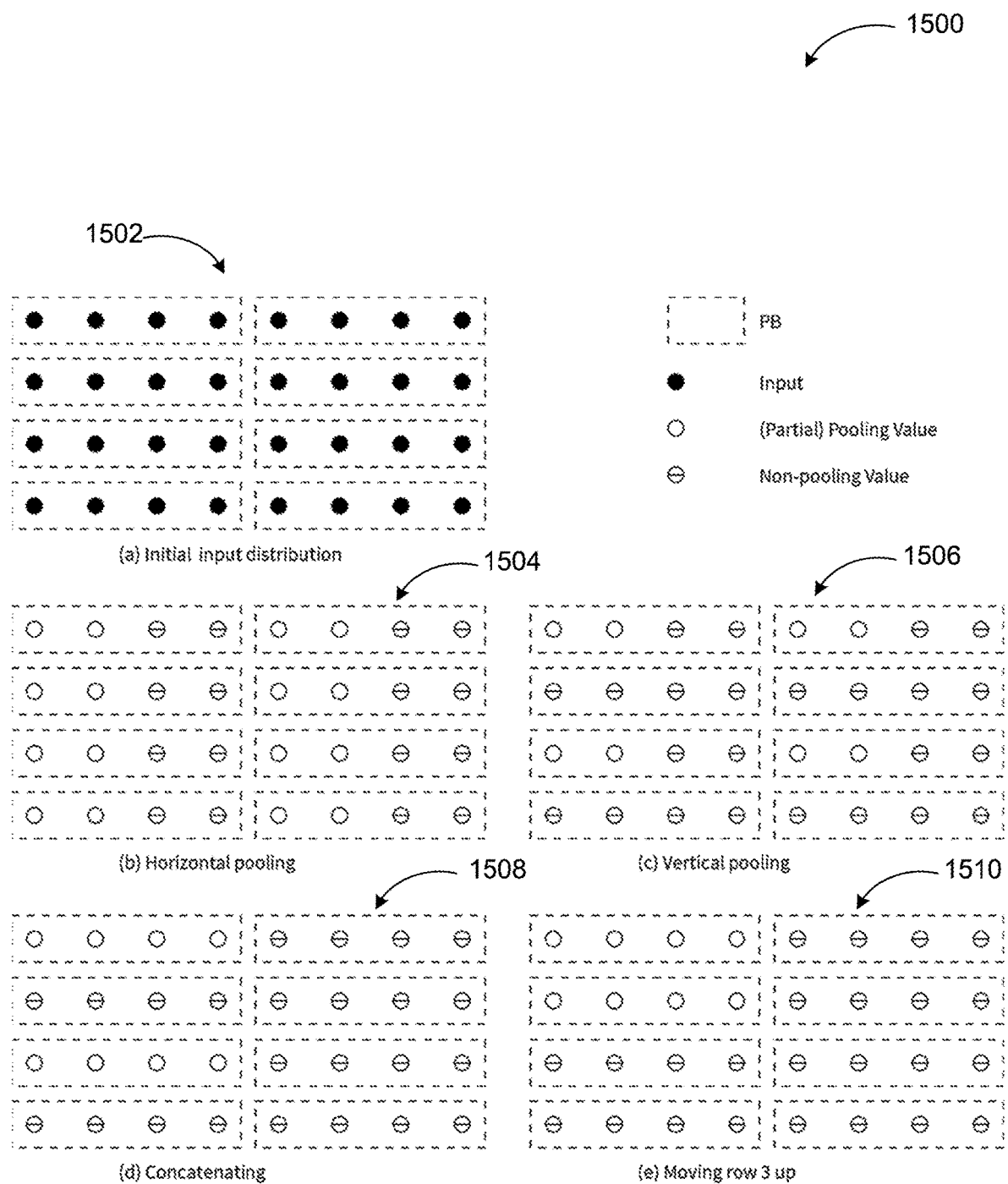
FIG. 15 illustrates implementation of partial pooling functions.

FIG. 15 illustrates implementation of partial pooling functions, arranged in accordance with embodiments described herein.

PU is capable of performing multiple types of pooling functions of variable kernel size. A pooling function can be decomposed to horizontal pooling, vertical pooling, concatenating functions. It is usually necessary to move values between selected rows or columns in order to save the pooling results in localized distribution. Diagram 1500 is an example for performing 2×2 pooling on a 4×8 are of the input matrix. The input values 1502 are distributed to a 4×2 area of the PB matrix where each PB is holding 4 input values. In sub-graph (b) 1504, a horizontal pooling function "merges" every pair of neighboring inputs in a PB into a partial pooling value. Thus, the output of the horizontal pooling function is a half word of partial pooling values. Here the exact function of "merging" is determined by the type of pooling function. For maximum pooling, merging is to select the larger value of the pair, while for average pooling, merging is to get the sum of the two values so that, when all 2×2 values are merged together, the average pooling value can be obtained by dividing the total sum by 4. In sub-graph (c) 1506, a vertical pooling function does value-wise merge on the words of each vertically neighboring PBs. Merging here has the same function as in the horizontal pooling function. In sub-graph (d) 1508, a concatenating function concatenates the half word of partial pooling values of every vertically neighboring PBs to form a complete word of pooling values. In sub-graph (e) 1510, pooling values are moved to the desired PBs by moving a selected row 3. Moving selected rows can be done by inserting proper local instructions to different rows of PBs. The exact definition of the horizontal pooling, vertical pooling and concatenating functions used in this example is showed in the following FIG.

FIG. 16 illustrates example partial pooling functions, arranged in accordance with embodiments described herein.

The example partial pooling function 1600 includes detail definitions of horizontal pooling, vertical pooling and concatenating functions for 2×2 pooling on 4-tuple values, where Ph: Horizontal pooling; Pv: Vertical pooling; and C: Concatenating.

Some embodiments are directed to example processes to operate a digital integrated circuit with embedded memory for neural network inferring. The operations of any process described herein are not necessarily presented in any particular order and that performance of some or all of the operations in an alternative order(s) is possible and is contemplated. The operations have been presented in the demonstrated order for ease of description and illustration. Operations may be added, combined, modified, omitted, and/or performed simultaneously, in a different order, etc., without departing from the scope of the present disclosure.

The illustrated process can be ended at any time and need not be performed in its entirety. Some or all operations of the processes, and/or substantially equivalent operations, can be performed by execution by one or more processors of computer-readable instructions included on a computer storage media, such as described herein, including a tangible non-transitory computer-readable storage medium. The term "computer-readable instructions," and variants thereof, as used in the description and claims, is used expansively herein to include routines, applications, application modules, program modules, programs, components, data structures, algorithms, or the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, or the like.

Figure 17:
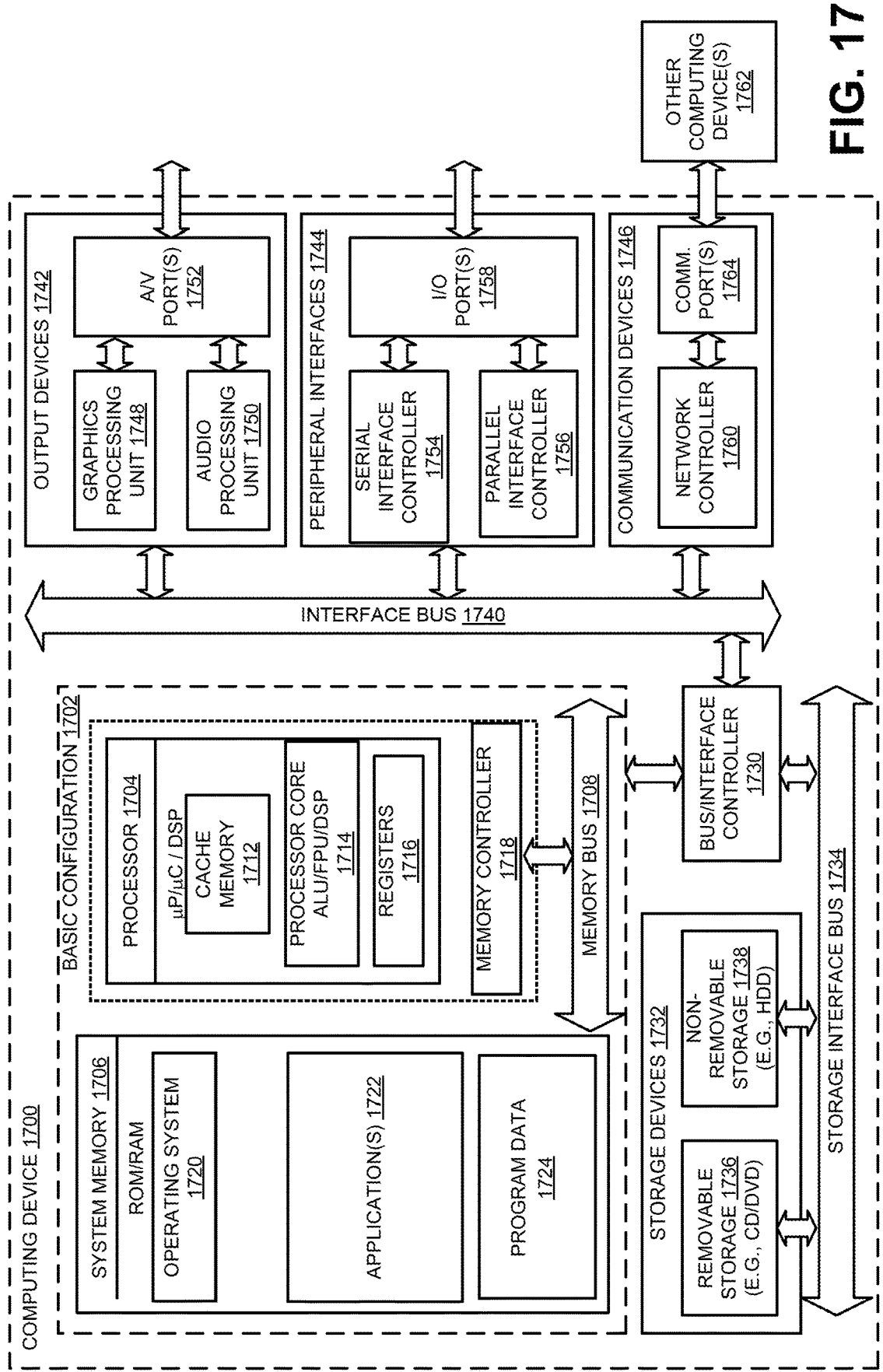
FIG. 17 illustrates an example computing device, where embodiment may be implemented, all arranged according to at least some embodiments presented herein.

FIG. 17 is a block diagram illustrating an example computing device 1700 that is arranged to incorporate or operate a digital integrated circuit with embedded memory for neural network inferring, in accordance with at least some embodiments described herein. In a very basic configuration 1702, computing device 1700 typically includes one or more processors 1704 and system memory 1706. A memory bus 1708 can be used for communicating between the processor 1704 and the system memory 1706.

Depending on the desired configuration, processor 1704 can be of any type including but not limited to a microprocessor (µP), a microcontroller (µC), a digital signal processor (DSP), or any combination thereof. Processor 1704 can include one more levels of caching, such as cache memory 1712, a processor core 1714, and registers 1716. The processor core 1714 can include an arithmetic logic unit (ALU), a floating point unit (FPU), a digital signal processing core (DSP core), or any combination thereof. A memory controller 1718 can also be used with the processor 1704, or in some implementations the memory controller 1712 can be an internal part of the processor 1704.

Depending on the desired configuration, the system memory 1706 can be of any type including but not limited to volatile memory (such as RAM), non-volatile memory (such as ROM, flash memory, etc.) or any combination thereof. System memory 1706 typically includes an operating system 1720, one or more applications 1722, and program data 1724.

Computing device 1700 can have additional features or functionality, and additional interfaces to facilitate communications between the basic configuration 1702 and any required devices and interfaces. For example, a bus/interface controller 1740 can be used to facilitate communications between the basic configuration 1702 and one or more data storage devices 1732 via a storage interface bus 1734. The data storage devices 1732 can be removable storage devices 1736, non-removable storage devices 1738, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media can include volatile and nonvolatile, removable and non-removable media implemented in any method or technology for storage of information, such as computer readable instructions, data structures, program modules, or other data.

System memory 1706, removable storage 1736 and non-removable storage 1738 are all examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which can be used to store the desired information and which can be accessed by computing device 1700. Any such computer storage media can be part of device 1700. Thus, any of the computer storage media may be implemented using the NVM memory structures with an XNOR cell and sense amplifier for AI applications as discussed herein.

Computing device 1700 can also include an interface bus 1740 for facilitating communication from various interface devices (e.g., output interfaces, peripheral interfaces, and communication interfaces) to the basic configuration 1702 via the bus/interface controller 1730. Example output devices 1742 include a graphics processing unit 1748 and an audio processing unit 1750, which can be configured to communicate to various external devices such as a display or speakers via one or more A/V ports 1752. Example peripheral interfaces 1744 include a serial interface controller 1754 or a parallel interface controller 1756, which can be configured to communicate with external devices such as input devices (e.g., keyboard, mouse, pen, voice input device, touch input device, etc.) or other peripheral devices (e.g., printer, scanner, etc.) via one or more I/O ports 1758. An example communication device 1746 includes a network controller 1760, which can be arranged to facilitate communications with one or more other computing devices 1762 over a network communication via one or more communication ports 1764. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, communication media can include wired media such as a wired network or direct-wired connection, and wireless media such as acoustic, radio frequency (RF), infrared (IR) and other wireless media. The term computer readable media as used herein can include both storage media and communication media.

Computing device 1700 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1700 can also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, compounds, or compositions, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include, but not be limited to, systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

Further, the use of the terms "first," "second," "third," "fourth," and the like is to distinguish between repeated instances of a component or a step in a process and does not impose a serial or temporal limitations unless specifically stated to require such serial or temporal order.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," or the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A digital integrated circuit device with embedded memory for neural network inferring, the device comprising:
    a controller;
    a matrix of processing blocks, wherein each processing block is communicatively coupled to the controller and N neighboring processing blocks, wherein N is an integer number equal to or larger than 1; and
    a cyclic bidirectional interconnection configured to transmit each processing block's output to the N neighboring processing blocks,
    wherein there are same bidirectional connections between leftmost and rightmost processing blocks of each row of the matrix, and between uppermost and lowermost processing blocks of each column of the matrix, so that each row and each column have cyclic connections, respectively.

2. The device of claim 1, wherein each processing block comprises:
    an invariant word buffer to store invariant words during one complete neural network inferring procedure, the invariant words include neural network parameters of a neural network;
    a variant word buffer to store variant words during a neural network inferring procedure, the variant words are layer input data of the neural network;
    an input selector to select an output from one of the N neighboring processing blocks; and
    a processing unit configured to receive inputs from the invariant word buffer, the variant word buffer, the input selector, and the controller, and provide an output as an output of the processing block to the N neighboring processing blocks.

3. The device of claim 2, wherein the input selector is a memory addressing selector or a multiplexer.

4. The device of claim 2, wherein N is an integer between 1 and 8.

5. The device of claim 2, wherein the processing unit is configured to receive as input from the input selector a selected output of one of the N neighboring processing blocks.

6. The device of claim 2, wherein the output of the processing unit is stored in one of the invariant word buffer and the variant word buffer.

7. The device of claim 2, wherein the processing unit is configured to perform one or more of a multiply-accumulate function, a partial convolution function, a partial pooling function, a normalization function, or an identity function based on an input from the controller.

8. The device of claim 2, wherein the variant word buffer is implemented as a static random-access memory (SRAM) block, and the invariant word buffer is implemented as a non-volatile memory (NVM) block.

9. The device of claim 8, wherein network parameters and local instructions are stored in the NVM block such that upon activation, the matrix of processing blocks is ready to perform neural network inferring on received inputs without an activation setup.

10. The device of claim 2, wherein an input distribution to each layer is organized as localized distribution such that any two neighboring inputs in the input organization are distributed to either the same processing block or two neighboring processing blocks in the matrix of processing blocks.

11. The device of claim 10, wherein an input of a convolutional layer of the matrix is arranged as an input tensor and the localized distribution of the input tensor is derived from localized distributions of input matrices of the input tensor.

12. The device of claim 11, wherein the localized distribution of the input tensor is derived from a matrix distribution for all input matrices of the input tensor by assigning an input in the input tensor to a same processing block determined by the matrix distribution the input belongs to.

13. A method for operating a digital integrated circuit device with embedded memory for neural network inferring, the method comprising:
    receiving a first input from an input selector at a processing unit of a processing block in a matrix of processing blocks, wherein each processing block is communicatively coupled to a controller and N neighboring processing blocks;

receiving a second input from an invariant word buffer of the processing block;

receiving a third input from a variant word buffer of the processing block;

receiving a fourth input from the controller;

processing the received first, second, third, and fourth inputs by applying a function selected based on the fourth input; and providing an output based on the application of the function to four neighboring processing blocks of the processing block, wherein there are same bidirectional connections between leftmost and rightmost processing blocks of each row of the matrix, and between uppermost and lowermost processing blocks of each column of the matrix, so that each row and each column have cyclic connections, respectively.

14. The method of claim 13, receiving the first input from the input selector comprises receiving a selected one of four outputs from the four neighboring processing blocks of the processing block.

15. The method of claim 13, wherein applying the function selected based on the fourth input comprises:

applying one or more of a multiply-accumulate function, a partial convolution function, a partial pooling function, a normalization function, or an identity function based on an input from the controller.

16. The method of claim 13, further comprising:

storing the output to one or more of the buffers in the processing block.

17. The method of claim 13, further comprising:

storing neural network parameters in the invariant word buffer and layer input data of a neural network in the variant word buffer.

18. The method of claim 13, further comprising:

organizing an input distribution to each layer as localized distribution such that any two neighboring inputs in the input organization are distributed to either the same processing block or two neighboring processing blocks in the matrix of processing blocks.

* * * * *